US010429547B2

(12) United States Patent
Curry

(10) Patent No.: US 10,429,547 B2
(45) Date of Patent: Oct. 1, 2019

(54) SYSTEMS AND METHODS OF REMOTE WEATHER DETECTION FOR CONSTRUCTION MANAGEMENT

(75) Inventor: John E. Curry, Auburn, AL (US)

(73) Assignee: Trimble Inc., Sunnyvale, CA (US)

( * ) Notice: Subject to any disclaimer, the term of this patent is extended or adjusted under 35 U.S.C. 154(b) by 1978 days.

(21) Appl. No.: 12/123,711

(22) Filed: May 20, 2008

(65) Prior Publication Data
US 2009/0292470 A1 Nov. 26, 2009

(51) Int. Cl.
*G01W 1/14* (2006.01)
*G01S 13/95* (2006.01)

(52) U.S. Cl.
CPC .............. *G01W 1/14* (2013.01); *G01S 13/95* (2013.01); *Y02A 90/18* (2018.01)

(58) Field of Classification Search
CPC ................................ G01W 1/14; G01S 13/95
USPC ...... 702/2, 3, 4, 5, 150; 340/870.01, 870.02, 340/870.03, 870.05–870.11, 539.1, 340/539.16, 539.17, 539.22, 539.26, 340/539.28, 601, 602; 73/170.16–170.18, 73/170.28; 455/404.1, 404.2, 40, 500
See application file for complete search history.

(56) References Cited

U.S. PATENT DOCUMENTS

| 6,862,528 B2* | 3/2005 | Scannell | 702/3 |
|---|---|---|---|
| 6,980,908 B2* | 12/2005 | McKewon et al. | 702/3 |
| 7,558,674 B1* | 7/2009 | Neilley et al. | 702/3 |
| 7,602,285 B2* | 10/2009 | Sznaider et al. | 340/539.28 |
| 2001/0030624 A1* | 10/2001 | Schwoegler | G01W 1/10 342/357.52 |
| 2004/0010372 A1* | 1/2004 | Schwoegler | 702/3 |
| 2005/0038763 A1* | 2/2005 | Cole | G01F 23/0061 706/20 |
| 2008/0061959 A1* | 3/2008 | Breed | B60C 11/24 340/539.1 |
| 2009/0326723 A1* | 12/2009 | Moore et al. | 700/284 |

FOREIGN PATENT DOCUMENTS

JP          2004028625 A  *  1/2004

* cited by examiner

*Primary Examiner* — Ricky Ngon
(74) *Attorney, Agent, or Firm* — Kilpatrick Townsend and Stockton

(57) ABSTRACT

The present invention is directed to systems and methods for managing and regulating construction sites, particularly in light of inclement weather or hazardous conditions. In many jurisdictions, extreme weather conditions, including excessive precipitation, render a construction site closed, or unworkable, thereby wasting time and resources. This invention provides a system and processes to monitor, detect and measure precipitation on a construction site, and even several sub-sites on the construction site, from a remote location. The system and processes of the present invention also provide features to further investigate precipitation levels in a more efficient manner than conventionally available and to communicate the construction site conditions, e.g., precipitation levels, and whether the site has met the required regulatory thresholds for inspection. Moreover, the present invention may be used to determine the magnitude of rain events, and potential liabilities associated therewith.

28 Claims, 10 Drawing Sheets

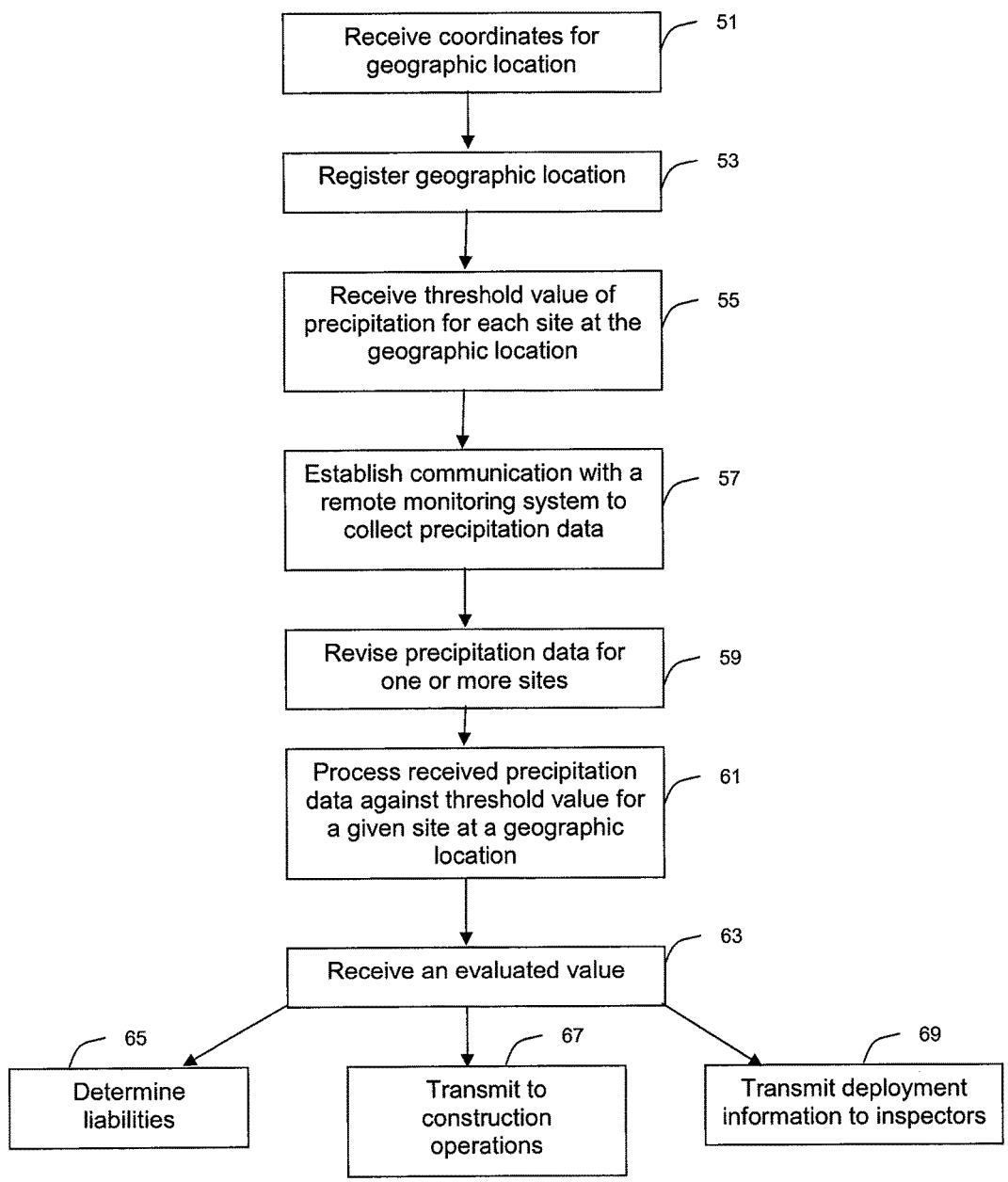

SYSTEMS AND METHODS OF REMOTE WEATHER DETECTION FOR CONSTRUCTION MANAGEMENT

FIELD OF THE INVENTION

This invention relates to systems and methods for measuring precipitation impact on construction and engineering sites to assess working conditions and construction liabilities.

BACKGROUND OF THE INVENTION

Construction and/or engineering projects, particularly public works projects, typically involve coordination between one or more construction entities and/or one or more engineering entities performing the work, and one or more federal, state, and local regulatory bodies funding, supervising and/or otherwise monitoring the work. Generally, the construction and engineering entities must adhere to rules and regulations, including when, where, and how to operate. That is, the rules and regulations typically dictate conditions that would prohibit construction or operation on the site for periods of time. For example, construction and engineering is often shut down when hazardous or inclement weather, such as wind, temperature, snow or rain and resulting precipitation, is present in certain amounts. In some scenarios, construction teams are sometimes unable to operate on sites that are too wet. In practice, a contractor/engineer may simply shut down a construction site or call for an inspection of a construction site when the site receives a predetermined amount of rainfall because of unproductive work conditions, such as the lack of soil compaction.

When rain and precipitation are present, construction and engineering on the site is often dependent on an onsite inspection of the construction site. There, soil samples or water measurements, for instance, are physically taken from the construction site and then analyzed, as necessary. The precipitation levels are often compared to threshold amounts, as dictated by governing regulatory agencies typically. Traditional rain gauges have been used to determine precipitation amounts, but the use of these gauges alone can result in deficiencies and inaccuracies. Accordingly, another severe limitation of this "hands on" method is the investment of time, energy and costs. For example, in any given jurisdiction, particularly states with large square areas, numerous construction sites likely exist, and thus investigating each site becomes an onerous effort. Onsite inspections would likely require, at least, a sizeable staff of inspectors and travel. Additionally, the site surveyors responsible for collecting the data are likely associated with a large aggregate sum of compensation.

Moreover, conventionally, the decision regarding whether work on a construction site would be permitted when there is rain is based on physical samples obtained from only a few data points, if not a single data point, from the entire construction site. Thus, one data point that indicates there is an excess amount of rainfall, or resulting precipitation, can shut down an entire construction site for one or more days. Yet, it is possible, common even, for rain to affect one area of the construction zone, but not affect another. Under traditional regulatory schemes, however, the entire construction zone would be subject to be closed to construction crews or a time-intensive, cost prohibitive, onsite inspection if any area within the construction zone meets the threshold level of precipitation.

The deficiencies of such a sampling technique are exemplified on a construction project covering several miles. Conventionally, regulations would require samples/readings to be taken at the site after a storm event to determine if the site is suitable for construction operation. Thus, the regulatory body or the construction entity would deploy inspectors to perform a site inspection. Rain on the proximal end of the roadside project may shut down the entire project, regardless of the fact that no rainfall fell on the distal end of the project.

SUMMARY OF THE INVENTION

There remains a need in the art for a system and methods thereof to efficiently assess the affect of weather or other conditions on a construction or engineering site. More specifically, there is a need in the art to provide systems and methods thereof that can remotely monitor conditions at multiple sites within a construction site to reduce inspection costs, to avoid unnecessary shut down of operations and to facilitate compliance with one or more regulatory bodies. Furthermore, there is a need in the art for a system and related methods to log precipitation conditions over the course of a construction project.

In accordance with principles of the present invention, a remote construction and engineering site monitoring systems and methods are provided. A construction site may include, for example, a road, a bridge, a tunnel, a dam, a building, a combination thereof, or any construction site and the grounds of and adjacent to such site. In embodiments of the present invention, the systems or methods allows the construction site to be subdivided into sub-sites so that construction shut downs may be contained to less than the entire construction site.

Preferred embodiments of the present invention are directed to a method for measuring the impact of a weather condition, preferably precipitation, on construction and engineering sites that includes the following steps: determining a predetermined geographic location, which is the subject of construction and engineering; setting a remote monitoring system, such as a system using Doppler radar data, satellite system, or weather stations disposed about a site, to detect a predetermined threshold value of precipitation at the predetermined geographic location; remotely monitoring precipitation levels at the predetermined geographic location; evaluating the precipitation levels against the threshold value to obtain an evaluated value; and providing an evaluated value to the end-user. Precipitation values can be determined for some time in the past, near-real-time, preferably more than one minute old. Precipitation values can preferably be determined from a period that can be a duration starting from the commencement of an event (e.g., rain commences) up to a point in time thereafter, which may for example reflect a past weather condition. In other embodiments, the Doppler data may be collected more than five minutes, ten minutes, twenty minutes, thirty minutes, or sixty minutes in the past relative to processing by the system. If desired, the determination may involve the use of current conditions rather than a past condition.

In some embodiments, the methods can include the steps of deploying an on-site inspection of the predetermined geographic location when the evaluated value is greater than or equal to the threshold value, determining the ability to perform construction and engineering at the predetermined geographic location when the evaluated value is greater than or equal to threshold value, comparing the evaluated value to a rain event value, and/or determining liability associated with a construction or engineering company.

Another embodiment of the present invention is directed to a method for measuring precipitation impact on construction and engineering inspection locations including the steps of receiving the coordinates for a particular geographic location, wherein the geographic location is the subject of construction and engineering, processing a threshold value of precipitation at the geographic location, receiving precipitation levels at the geographic location from a remote monitoring system, processing the precipitation levels against the threshold value to provide an evaluated value, and transmitting the evaluated value to an end user. In some variations of this embodiment, the method also includes, for example, processing documentation related to the construction and engineering at the geographic location, processing an on-site inspection of the geographic location; and transmitting an order for the on-site inspection to one or more inspectors. Another variation includes the step of processing liability, and potential liability, dependent on the precipitation levels for one or more construction and engineering entities.

Some embodiments of the present invention are directed to an article of manufacture including a computer readable medium; a data structure stored thereon adapted and configured to route signals, wherein the data structure comprises a computer readable system for measuring precipitation impact on construction and engineering inspection locations. The system further includes a processing system configured and adapted to communicate with a plurality of computers, wherein the processing system is arranged to accept input of coordinates of a predetermined geographic location, wherein the predetermined geographic location is the subject of construction and engineering; a remote monitoring system about the predetermined geographic location, wherein the remote monitoring system is programmed to detect a predetermined threshold value of precipitation; precipitation levels on the predetermined geographic location; an evaluation of the precipitation levels against threshold value, wherein the evaluation results in an evaluated value; and an alert to an end-user comprising the evaluated value.

Yet another embodiment of the present invention is directed to a system for measuring precipitation impact on construction and engineering inspection locations having means for determining a predetermined geographic location, wherein the predetermined geographic location is the subject of construction and engineering; means for establishing a predetermined threshold value of precipitation about the predetermined geographic location; means for remotely monitoring precipitation levels on the predetermined geographic location; means for evaluating precipitation levels on the predetermined geographic location against the threshold value for the predetermined geographic location to obtain an evaluated value; and means for alerting an end-user of the evaluated value.

BRIEF DESCRIPTION OF THE DRAWINGS

Further features of this invention, its nature and various advantages will become more apparent upon consideration of the following detailed description, taken in conjunction with the accompanying drawings, in which like reference characters refer to like parts throughout, and in which:

FIG. 1a is another exemplary flow chart illustrating the process for monitoring a construction site in accordance with one embodiment of the present invention;

DETAILED DESCRIPTION OF EXEMPLARY EMBODIMENTS

Figure 1:
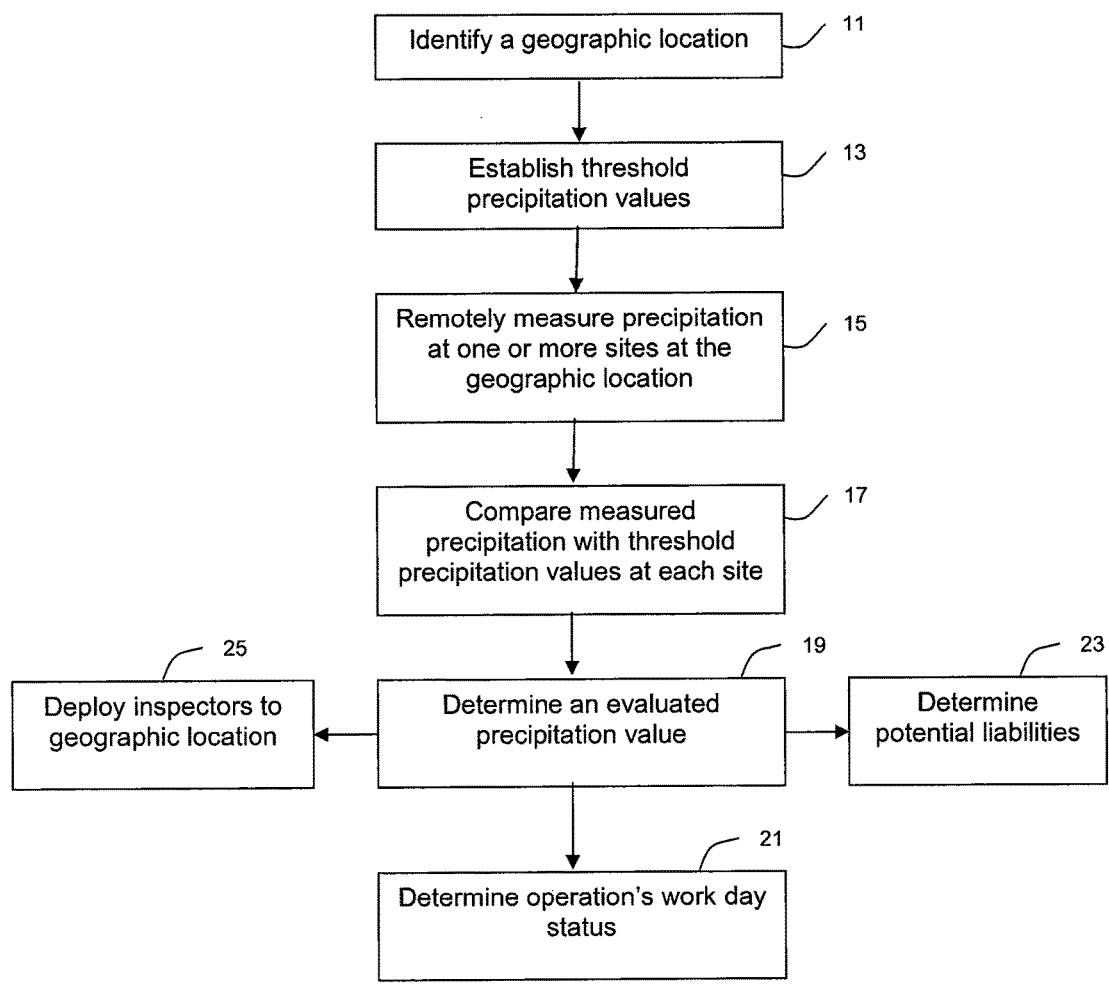
FIG. 1 is an exemplary overview flow chart of the features related to the construction and engineering site monitoring and reporting system in accordance with one embodiment of the present invention.

Systems and methods that remotely monitor weather conditions on or around a geographic location, such as a construction site, and analyze this information to determine further actions on the construction site are provided. In preferred embodiments, the system and methods of the present invention further include providing the monitored and/or analyzed information to a third party, such as a regulatory body, construction and or engineering entity, or other party associated with the construction site.

In some embodiments, weather conditions are remotely monitored using satellite, radar, or weather detection systems disposed on the construction site. In certain embodiments, this invention involves manipulating and processing rain data and monitoring rainfall by utilizing a direct feed of Doppler data. This is a more efficient and focused means of monitoring rain data than conventional methods of onsite inspection and sampling, as it is capable of focusing on specific areas (e.g., outfalls) impacted by storm events (also referred to as "rain events"), thus eliminating unwarranted inspections, and overbroad and potentially misleading results. Through this method, each outfall in a given area can be tagged and monitored, and an electronic log of the rainfall can be generated, resulting in a more reliable, representative and consistent report of rain data in that monitored area.

The present invention provides numerous embodiments, each of which provide many applications. For example, in some embodiments, a monitoring report of precipitation can be generated, for instance, which is published in intervals, such as daily, weekly, monthly or quarterly. The system can also, for example, monitor observed precipitation amounts versus threshold amounts and provide notification to interested parties when the observed amount is below, at, or above the threshold amount. Other embodiments involve determining the recurrence interval of the rain, and in some variations, calculate the liabilities corresponding to violations of permitting and storm water run off and water quality control practices. Another feature can be to provide a monitoring system for insurance, arbitration, or other dispute resolution party to provide independent and accurate third party precipitation information to settle disputes, such as how many rain days occurred during a construction contract or whether drought conditions were met (e.g., to monitor a site on behalf of an insurance company).

Thus, numerous advantages over the prior art can be achieved, including acknowledging and accounting for the fact that rainfall is not usually uniformly distributed, more robust monitoring system (e.g., providing virtual analysis at many more loci at the construction site than through onsite sampling), more efficient monitoring (e.g., reduction in non-warranted inspections), more effective inspections (i.e., areas determined to be impacted by a rain event are given increased attention, significance and resources, such as inspections), providing a greater probability meeting budgetary and time constraints, a more complete and accurate record of weather over a geographic location, and a reduction in the incidences and prevalence of liability (e.g., for precipitation-related damages).

As used herein, "construction or engineering site/location" are commonly referred to herein as "construction site," "project site," or "site") or may be generically referred to as a "predetermined geographic location" or "predetermined location." A construction site is a location that is the subject of remodeling, construction, engineering, building, design, excavation, structuring, or other physical improvement, modification, or development of an area of land. In some embodiments, a construction site may include any disturbed land. A construction site may be public, such as a project commissioned as a public works or by a government entity, or private, such as real estate or land development. Exemplary construction and engineering sites may include stretches of road (e.g., highways, interstates, etc.), bridges, tunnels, dams, buildings, storm water treatment areas, railroad tracks, runways, projects in or around rivers or lakes, combinations thereof, or grounds of and adjacent thereto. In preferred embodiments, each geographic location is associated with coordinates, such as by using longitude and latitude measurements, global positioning systems (GPS), or triangulation techniques.

As used herein, the terms "loci," "sub-sites," and "outfalls" are used interchangeably to encompass locations or specific sites within a construction site, which are preferably monitored by the systems and processes of the present invention. Each construction site may contain one or more outfalls. In preferred embodiments, the outfalls may be captured by dividing the entire construction site into smaller areas. For example, a construction site may be mapped onto a one kilometer by one kilometer grid, or any area (even smaller than a 1 square kilometer) that is technologically feasible, that corresponds to the particular geographic area monitored through Doppler data. Automated software can calculate rainfall accumulation at given points and continuously update in real time. As shown in FIG. 4a, the construction site on the representative road construction site is divided into at least four subunits.

As used herein, a "construction or engineering entity," may include one or more persons and/or one or more organizations, responsible for addressing the construction site. Generally, a construction or engineering entity may include, for example, a construction company, wrecking crew, surveyors, designers, architects, contractors, subcontractors, builders, developers, engineers, inspectors, or a combination thereof.

As used herein, a "regulatory body" encompasses one or more persons and/or one or more organizations that govern, dictate, monitor, regulate, supervise, have jurisdiction over or otherwise enforce policies related to construction or engineering projects at the predetermined geographic locations. A regulatory body may be a public, governmental entity, such as, for example, a Department of Public Works, Highway Commission, Public Utility Commission, Department of Transportation, or other government agency. In other embodiments, the regulatory body is quasi-public, such as an energy company, or private, such as a construction company, for example.

As used herein, weather data may include any measurable or quantifiable weather or meteorological condition or phenomena, such as, for example, rainfall, precipitation, rainfall, temperature, wind speed, cloudiness, barometric pressure, snowfall, sleet, hail, and ice. Moreover, as used herein, "precipitation levels" encompass any amount of water, from any source, preferably atmospheric weather, such as rain, sleet, snow, and hail, for example. Precipitation is generally related to rainfall, and can therefore by calculated using algorithms, interpolations, and other calculations, known to one skilled in the art.

Generally, "monitoring" of precipitation levels, and weather generally, encompasses the use of detection technology, such as radar, preferably Doppler, satellite imagery, communication methods to receive and transmit information, processors and computer systems to interpret and process information, and other means known to one skilled in the art.

As used herein, "threshold level" refers to a level, when met, that requires or suggests certain actions are taken or occur. For example, threshold levels may provide weather conditions, such certain levels of precipitation or rainfall, wind speeds, and/or temperatures that may require inspection or construction site. Threshold levels may be a product of a regulatory body, either public or private. For example, a threshold level may be issued through an ordinance, rule, regulation or code passed, enacted, or enforced by a government agency. In another example, a threshold level may be dictated by a construction company, as an internal guideline, or by a third party, such as non-profit or for-profit organization focused on safety and health, as a recommended standard.

As used herein, the term "remote" describes at least two locations, preferably not in physical contact or adjacent to one another. Generally, a remotely located party may conduct itself in a location different than the subject matter location. For example, remote monitoring of a construction site may involve an operator or system that is located in an office building several miles away from the construction site. Typically, remote monitoring is conducted through communication signals or devices, such as the telephone, wireless transmissions and communication frequencies, the Internet or other network, or other system or process that allows two parties not in physical contact with one another to communicate.

As used herein, an "evaluated value" is a true or estimated value obtained through observation, monitoring, and/or gauging reflecting the actual physical conditions, e.g., precipitation levels, rainfall amounts, wind speed, and temperature, at a location at a particular time or period of time.

As used herein, an "onsite inspection" encompasses the act of physically travelling to or visiting a construction site in person. The term "inspection" encompasses any act of observation performed by an inspector, including measurement, review, gauging, analysis, determination, or general investigation of the premises of the construction site. In some jurisdictions, for example, an onsite inspection is required with 0.75 inches of rainfall/precipitation within a 24 hour period at the sample point.

As used herein, a "rain event" is a weather condition leading to precipitation, preferably measurable precipitation. Rain events are conventionally categorized by the amount of rain or precipitation and the probability of that amount, based on past weather data, for instance. For example, conventional terminology for rain events includes, for example, "1-year rain event," "2-year rain event, "5-year rain event," "10-year rain event," "25-year rain event," "50-year rain event," and "100-year rain event." In some jurisdictions, a 25-year rain event may correspond to three inches of rain in 24 hours. The characterization of a rain event is variable, by location, for example.

As used herein, "best management practices" (BMPs) encompasses strategies employed to maintain sediment or prevent erosion, including, for example, the placement of hay bales, sediment ponds, retaining walls, preservation or other plantings, silt fences, sod, and dams. Conventionally, construction companies may be requested or required to implement BMPs, and liability is associated with adherence to BMPs as related to rain events.

As used herein, the terms "liability" and "potential liability" are generally related to ownership, accountability or blame. In some embodiments, the term carries legal weight. With respect to this technology, for example, the term liability may be used to assess responsibility for results related to precipitation and construction, including, but not limited to, property damage, such as by flooding, sedimentation deposits, erosion damage, exceeding budget, failing to meet deadlines, particularly construction budget, fatalities and injuries, work stoppages, lost profits, revenues, wages, and other financial compensation or exchange, and specific performance or lack thereof by any party. For example, in some jurisdictions, a 25-year rain event may protect and/or insulate a construction company from negligence or recklessness, from compensatory or punitive damages, or from a failing to meet deadlines, i.e., the construction site would have been potentially shut down due to dangerous or inoperable precipitation conditions. In another example, liabilities for insurance companies that insure against drought conditions (such as on farms) or excessive delays due to rain can be more accurately and quickly monitored.

As used herein, an "alert" encompasses any communication or notification between two or more parties (i.e., humans), at least one system and at least one party, or two systems. The alert may be transmitted through any method of communications understood by one skilled in the art, including, for example, an audible signal (e.g., a siren), a voice call, SMS, MMS, cellular, GSM, CDMA, Wi-Fi, Wi-Max, wireless transmission, the Internet, LAN, WAN, email, and any other electronic tone, pulse, or packet transmitted via wired or wireless paths or combinations thereof. The alert is in real-time or substantially in real-time in preferred embodiments.

As used herein, an "end user" is any party or system receiving information or data from one or more embodiments of the system and processes of the present invention.

In some embodiments, the end user is a construction foreman, engineering company representative, regulatory official, or inspector.

As used herein, the term "process" encompasses any calculation, conversion, tabulation, or other manipulation of data using any algorithm or protocol to transmit, apply, use, adapt, or adopt data or other information.

As used herein, the concept of "operation" at a construction site generally refers to whether the construction site, or any part thereof, is available open to construction at a particular time. For instance, a construction site's operation may be closed for one day. This is commonly referred to as shutting down the site for a work day.

As used herein, "real-time" is preferably defined as the time in which reporting of events or recording of events is simultaneous with the event or occurring at the same time as another event/occurrence. As used herein "substantially real-time alert" is related to providing an alert within days of making a observation regarding a construction site (e.g., amount of precipitation), preferably within hours, more preferably within 30 minutes, even more preferably within 15 minutes, and most preferably within 5 minutes. In some embodiments, the alert is provided between 30 minutes to 24 hours after Doppler data is first received. As used herein, "near real-time" encompasses a time removed from the current time, such as a quarter minute, a half minute, a minute, two minutes, or more in the past. In some embodiments, near real-time is defined as a time occurring in the past.

Figure 4:
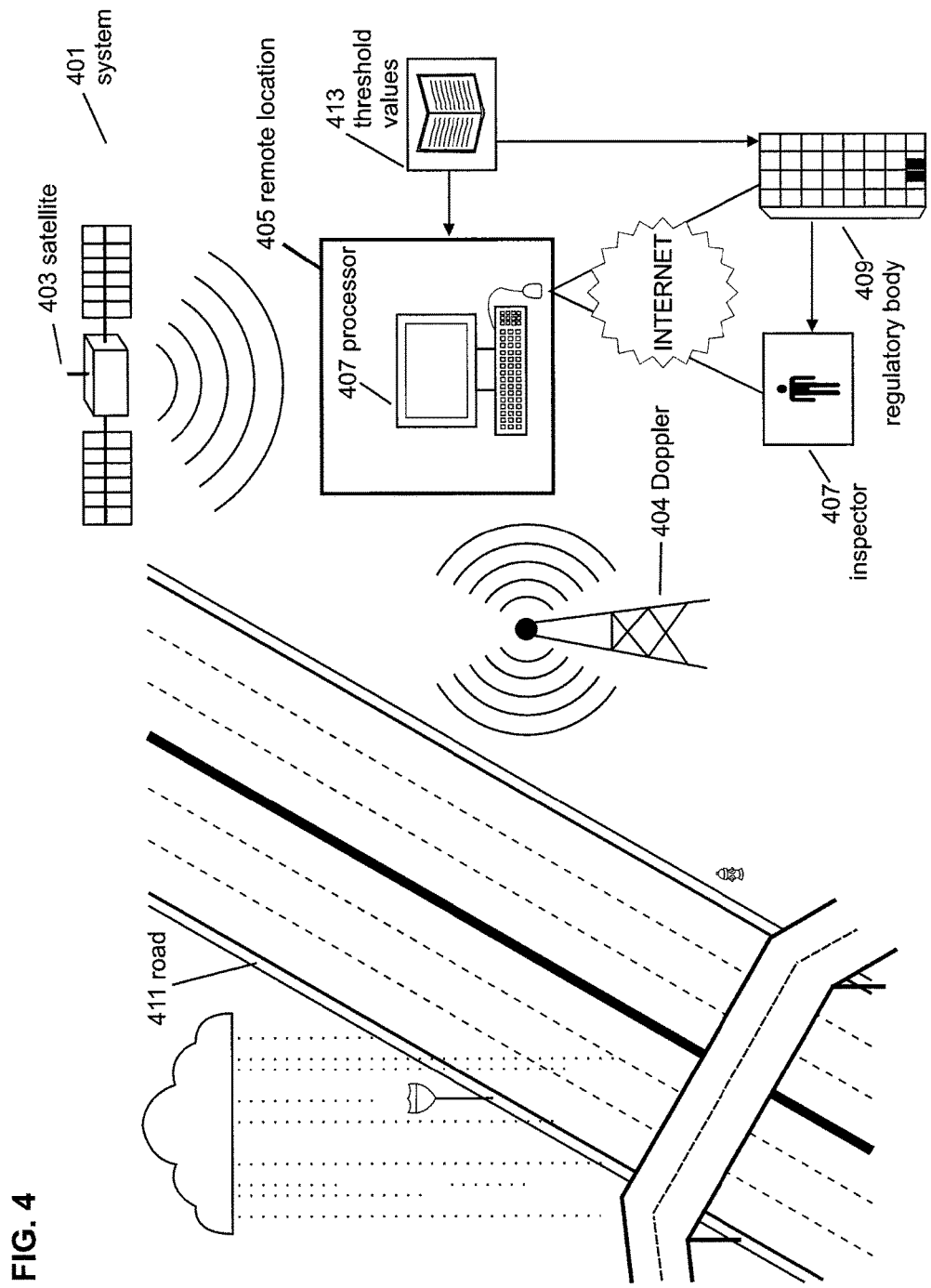
FIG. 4 is a functional block diagram of an exemplary system including components thereof in accordance with one embodiment of the present invention.
Figure 4A:
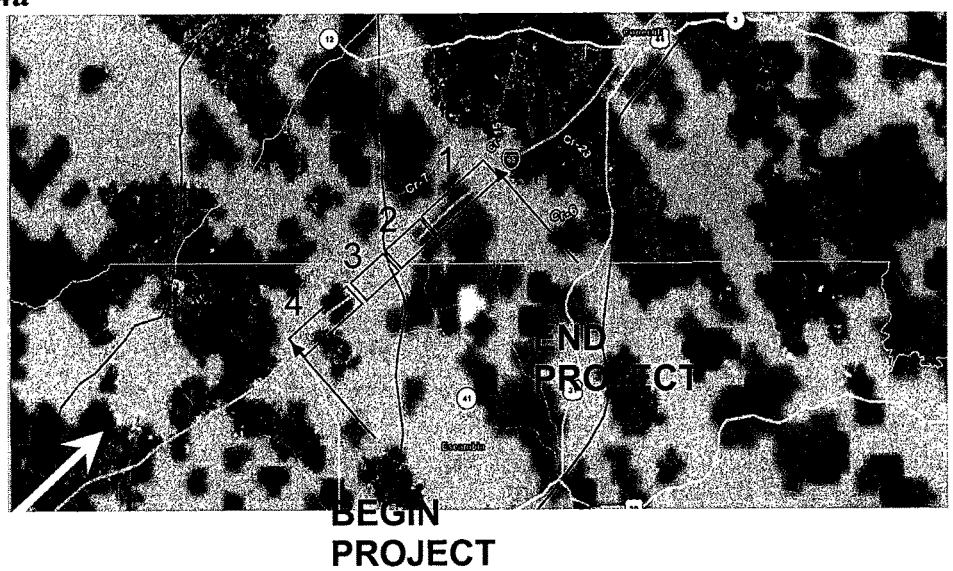
FIG. 4a is an exemplary representation of an image of a linear construction site with at least four sub-sites, in accordance with one embodiment of the present invention.

FIG. 4 provides an exemplary embodiment of the system 401 of the present invention with respect to a linear construction site 411. In the monitoring system, one or more monitoring devices, such as a Doppler radar 404 and a satellite 403 may be used to monitor rainfall and rainfall accumulation, i.e., precipitation, at the construction site 411, and then transmit the data to one or more processors 407 located at a location remote from the construction site 411. In this embodiment, the remote monitoring system is entirely remote from the construction site, i.e., no devices of the monitoring system are located at the construction site. The processor is in communication with and can process information from and to a regulatory body 409, which provides one or more threshold levels 413. The processor may determine whether an inspector 407 is required, and can, in turn, contact the inspector 407, using numerous communication devices, including the Internet.

The operation of, and the scientific basis for, Doppler radar would be understood to one skilled in the art. Generally, each Doppler radar transmits an energy pulse that reflects off a particle, such as a rain drop. The strength of the reflectivity is measured to calculate rainfall, which can be interpolated as precipitation. Several factors affect the accuracy and reliability of the data, including the size and distribution of raindrops and the rain drop distribution.

As would be known to one skilled in the art, Doppler data in the United States is available from the National Weather Service. Further, Doppler signals encompass a 143-mile radius. There are enough Doppler radar facilities deployed nationally to cover most of the United States. Doppler data are collected in regular and preferably frequent intervals. For example, in embodiments of the present invention, Doppler data is collected at hourly increments, preferably twice hourly increments, more preferably quarter hour increments, even more preferably at ten minute increments, and in a preferred embodiment at four to six minute increments. A five minute embodiment is commercially available, for example. It would be understood to one in the rate at which Doppler data is collected may vary, and can be as fast or as slow as technologically permitted.

In preferred embodiments, the collection of weather data is near-real-time, and is therefore not a reflection of the current conditions. That is, the system can be configured to collect data in the immediate past, such as several seconds before the current time up to several hours before the current time. Accordingly, the present invention is designed to provide precipitation levels, for example, that are not necessarily up-to-the minute like a weather forecast, but rather the precipitation as of a particular time in the past. However, if desired, real time determinations may also be implemented. In some embodiments, Doppler information is received every one minute, preferably every two minutes, more preferably between five to ten minutes, and even more preferably between five and twenty minutes. In most preferred embodiments, Doppler data is received every five minutes, or as frequently as transmitted by the National Weather Service or a service of the type.

In preferred embodiments, the amount of precipitation over a certain time period, e.g., 24 hours, is continuously adjusted and rolling. That is, for the first 24 hours, the total amount of precipitation is measured with data points every five minutes. At hour 23:00, the reading at hour 22:55 is deleted, and the 24-hour interval is calculated from 23:00 to 23:00 of the next day [which is 24 hours later]. In some embodiments, weather data collection from Doppler radar is continuous and non-stop. In other embodiments, collection of data is programmed for certain, predetermined time intervals. In yet other embodiments, collection of Doppler data is initiated manually or when rainfall is detected or expected at or near a construction site.

In additional embodiments, the remote monitoring system to collect and analyze weather data is comprised of one or more weather stations (also referred to herein as "locally disposed weather devices") located on the construction site and a remotely located processor. In these embodiments, various devices of the remote monitoring system are located on or near the construction site, and therefore the remote monitoring device is not entirely remote. The weather station can receive, evaluate, store, and transmit weather conditions, such as temperature, rainfall, and precipitation, for example. Preferably weather stations are networked to a central hub, operator or processor, and are self-powered (e.g., solar powered) instruments. In some embodiments, the weather conditions can be transmitted to the remotely located operator or processors 407, as shown in FIG. 4. Exemplary communication methods and systems include an automated voice call, SMS, MMS, cellular, GSM, CDMA, Wi-Fi, Wi-Max, wireless transmission, the Internet, LAN, WAN, email, and any other electronic tone, pulse, or packet transmitted via wired or wireless paths or combinations thereof. In a preferred variation of this embodiment, one or more weather stations located at multiple loci on a construction site measure and collect weather condition data, such as precipitation, and wireless transmit such data to a remotely located processor.

In one embodiment, as shown in FIG. 1, a geographic location, i.e., the construction site, is identified, as shown in step 11. This process may be conducted by the construction entity, a regulatory body, or other interested entity or individual. Preferably, coordinates for the construction site, and loci within the construction sites are identified. Furthermore, at the same time, after, or before identifying the construction site, one or more threshold values for the site are determined. In step 13, the threshold precipitation value is determined. As shown in step 15, the weather, in this scenario the precipitation, is measured at one or more of the locus at the construction sites. The remote monitoring may be conducted using satellite imagery, locally disposed weather stations, Doppler radar, or other sources of meteorological or weather data. In some embodiments, data source systems may also implement processing or calculation of raw data to provide pre-processing for the monitoring system. If desired, monitoring systems may include their own data source systems or devices, while in other systems, such data may be received in part or in whole from third party sources of data.

The system of the present invention processes the Doppler data at each outfall, or preferably at each targeted locus at the construction site to obtain a measured or observed value of precipitation at each locus. The measured value is compared with the determined threshold value, as shown in step 17, to determine an evaluated value, as shown in step 19. The evaluated value represents a value that indicates whether the measured value is below, at, or exceeds the threshold value. For example, if the evaluated precipitation value shown in step 19 is higher than the threshold value, inspectors may be deployed to the entire construction site, or preferably to the locus at the construction site with the excessive evaluated value. Alternatively, and in some cases additionally, a determination regarding that day's operation (i.e., work day or shut down) may be made, as shown in step 21, or a determination regarding potential liabilities may be made, as shown in step 23.

In FIG. 1a, embodiments of the present invention, as shown in this particular embodiment, may receive the coordinates for a geographic location, as shown in 53. Once received, as shown in step 53, the geographic location is registered by the system and is preferably mapped to monitorable areas, such as one square kilometer for conventional Doppler system. The system is provided with threshold values, as shown in step 55. For instance, a state may prohibit a construction work day if precipitation values exceed 0.75 inches. The system is configured to communicate with a remote monitoring apparatus, such as Doppler radar, to collect precipitation information, as shown in step 57. As data is collected by the monitoring apparatus, the system receives the data for the construction site, and preferably each of the sub-sites on the construction site, as shown in step 59.

In step 61 of FIG. 1a, the system processes the received precipitation data against the threshold values. Embodiments contemplate that the processing may be conducted remotely whereby calculations are received by the system, by the system itself, or a combination thereof. For example, Doppler data may be converted to precipitation data by an outsourced processor and received by the system, or the Doppler data (including rain information) may be received by the system and the system performs the precipitation calculations. In an exemplary embodiment, the system processes an evaluated value, as shown in 63, which indicates whether the threshold value has been met or exceeded. With this information, the system may perform several functions, such as process liabilities attributed to the construction company, for example, as shown in step 65, for flood damage. The system may also transmit to a construction company and/or regulatory body for them to determine whether the construction site is open for construction, as shown in step 67. Additionally, as shown in step 69, the system may communicate directly or indirectly with inspectors to authorize an onsite inspection, and onsite inspection information, such as the loci in which precipitation exceeding the threshold value was detected.

Figure 2:
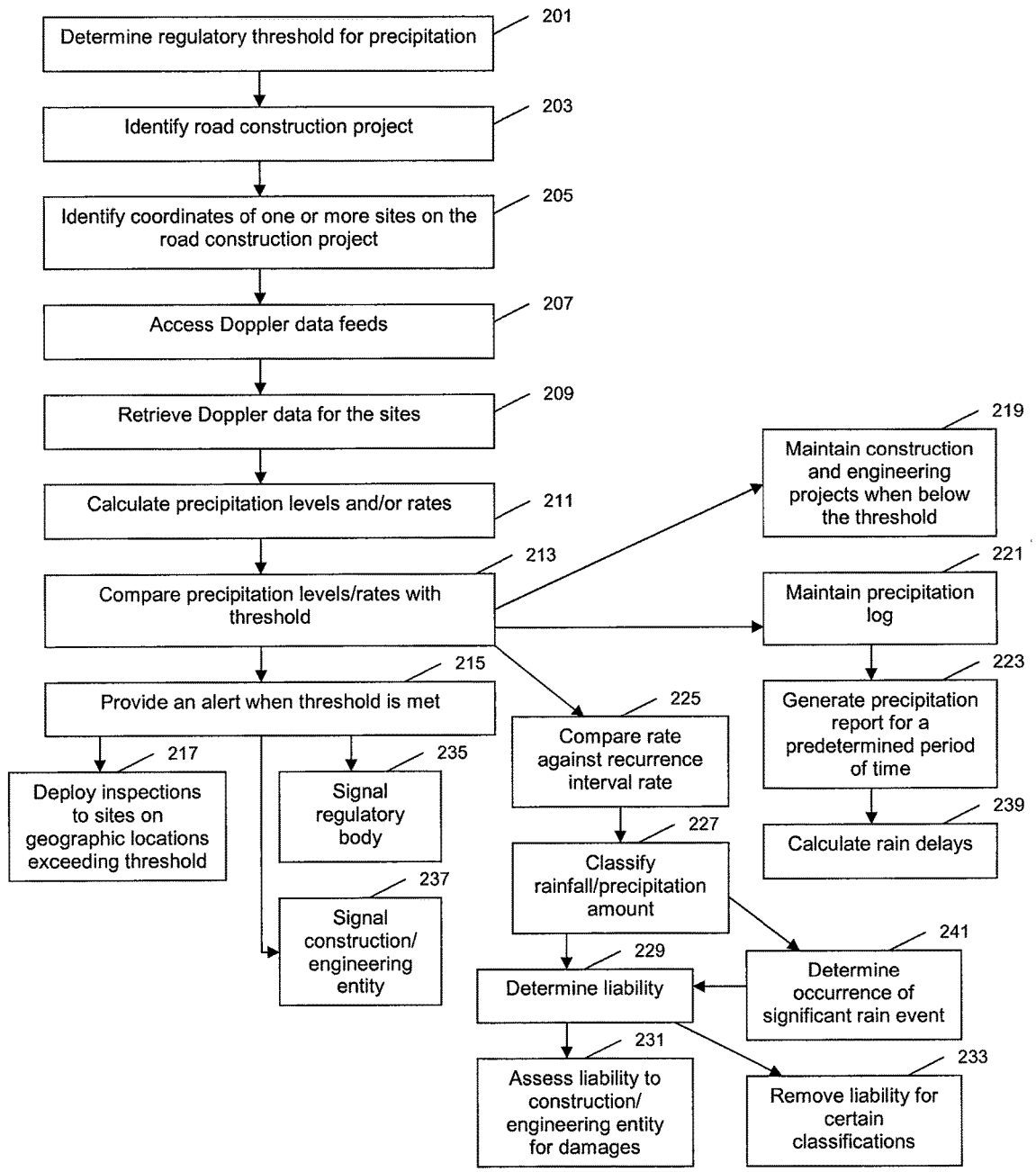
FIG. 2 is an exemplary flow chart illustrating multiple functionalities for monitoring and managing project sites in accordance with one embodiment of the present invention.

FIG. 2 provides a broad overview of the functionality of one embodiment of the system. In this embodiment, as shown in step 201, the regulatory thresholds for precipitation levels on a construction site are determined. The road construction site is identified, for instance, by using GPS, as shown in step 203. Moreover, the construction site is further mapped to divide the construction project into sub-sites, as shown in step 205. Doppler radar feeds are accessed in step 207, and data specific to one or more sub-sites is aggregated, as shown in step 209. In step 211, precipitation levels and/or rates are calculated by the system using methods that would be known to those skilled in the art. These precipitation levels and rates are compared to the known threshold values, as shown in step 213.

Numerous outcomes are possible from this comparison in step 213. For example, an alert, such as an email or short message service (SMS), as shown in step 215, may be provided such that inspectors are deployed to sub-sites determined to have precipitation levels exceeding the threshold level, as shown in step 217. In certain embodiments, the alert is provided within one day of receiving and processing precipitation levels. In other embodiments, the alert is preferably provided within twelve hours, more preferably six hours, even more preferably within three hours, yet more preferably within two hours, and most preferably within a one hour lag time from the time Doppler information is received. The alert may be directed to a regulatory body, such as a state's public works agency, as shown in step 235, or to a construction entity, as shown in step 237, which can further notify interested parties, such as employees, inspectors, or state agencies, for example. In the event that threshold levels are not reached, or there is no rule indicating that precipitation levels are too high, as shown in step 219, the construction company may proceed with an unencumbered work day at the whole construction site or certain loci, as determined based on the evaluated values.

The system may also provide a process to record and log rain events and days. In step 221, the system maintains a precipitation log. The recording intervals, duration of the log, and specific loci may be adjusted without limitation. As shown in step 223, the system may generate a precipitation report that tabulates precipitation over a certain time, such as a week, a month, a year, or longer. The log may be used to calculate an anticipated number of rain days, as shown in step 239, which may be important as construction on the site continues, or as future construction projects are designed. The log may also be used to provide impartial rain day calculations to determine an accurate number of rain days, and in some cases, settle any disputes regarding rain days, such as between a construction company and the state.

As shown in step 225, embodiments of the present invention may also be used to calculate liabilities associated with rain/storm events. The system can compare the precipitation levels and rates to determine a recurrence interval rate. This data may be used to classify the precipitation amount, for example as a 10-year rain event or a 25-year event, for example, as shown in step 227. As shown in steps 241 and 229, the system can make the determination as to whether the occurrence of a storm event qualifies as a significant rain event, as defined by a regulatory body, such as the state, and it can determine whether there is the potential for liability. Accordingly, in steps 231 and 233, liability may or may not be assessed to a construction company for damages caused by rainfall and precipitation.

Figure 3:
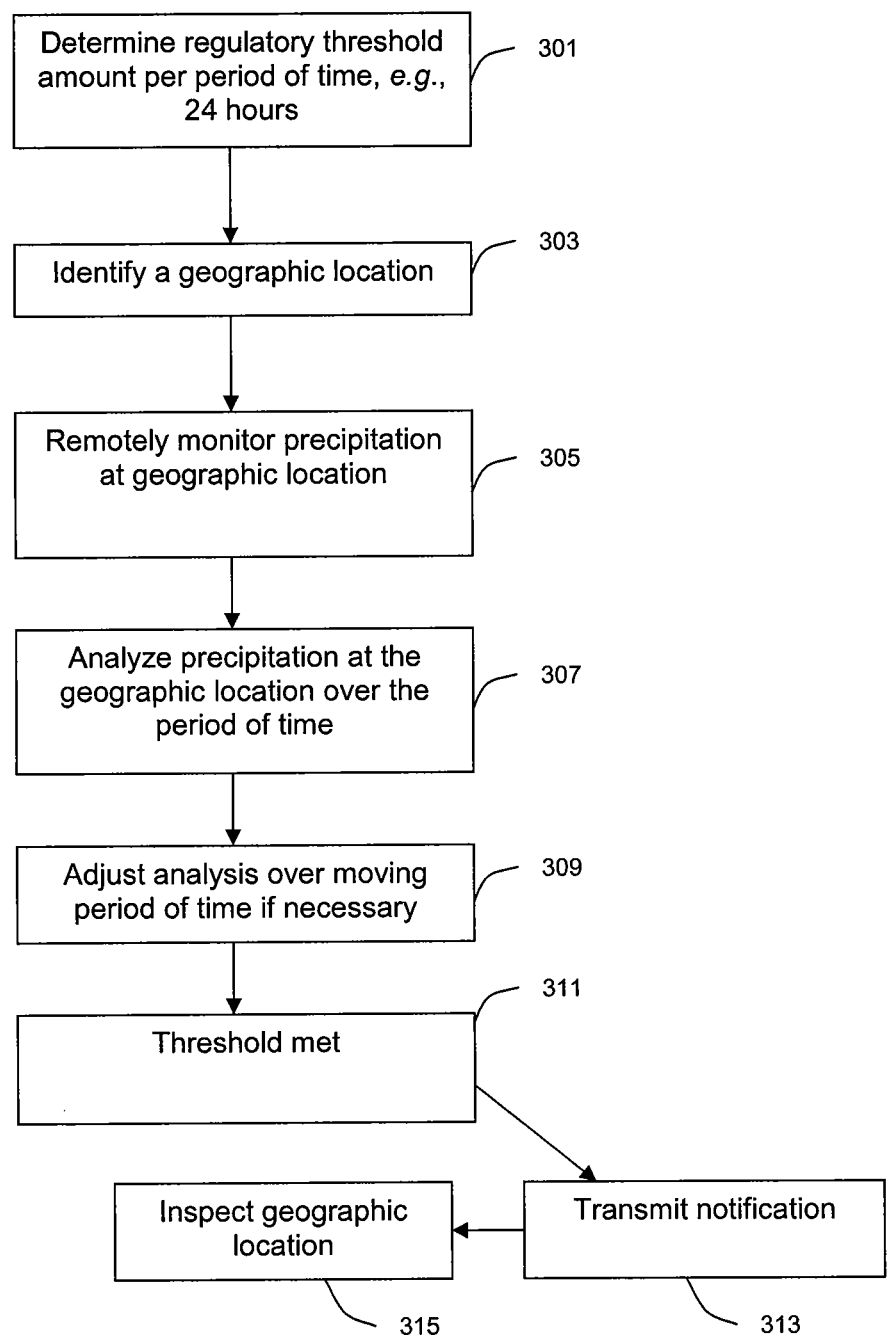
FIG. 3 is an exemplary flow chart illustrating a process for continuous monitoring of a construction and engineering site in accordance with one embodiment of the present invention.

FIG. 3 provides another overview of the functionality of some embodiments of the present invention with respect to continuous monitoring of a construction site. In step 301, the system determines the prescribed regulatory threshold rate for precipitation, at which construction at the sampled loci, may be halted as a matter of practice, until precipitation levels recede below the threshold level. The system identifies the geographic location at issue, as shown in step 303, and remotely monitors the location, using incoming Doppler radar data, as shown in step 305. In step 307, the precipitation at the construction site over a period of time, such as 24 hours, is calculated. As time progresses, the rate of precipitation is adjusted for each 24-hour interval, as shown in step 309. If during any 24-hour period, the threshold precipitation rate is met or exceeded, the system engages in a communication that would result in an inspection of "best management practices," e.g., silt fences, hay bales, check dams, and sediment ponds, which are in place to stop erosion, which is shown in step 311. Under the best management practice, an inspection of the site is requested, as shown in step 315, preferably after a notification is sent to one or more parties further monitoring the construction site, as shown in step 313.

Figure 3A:
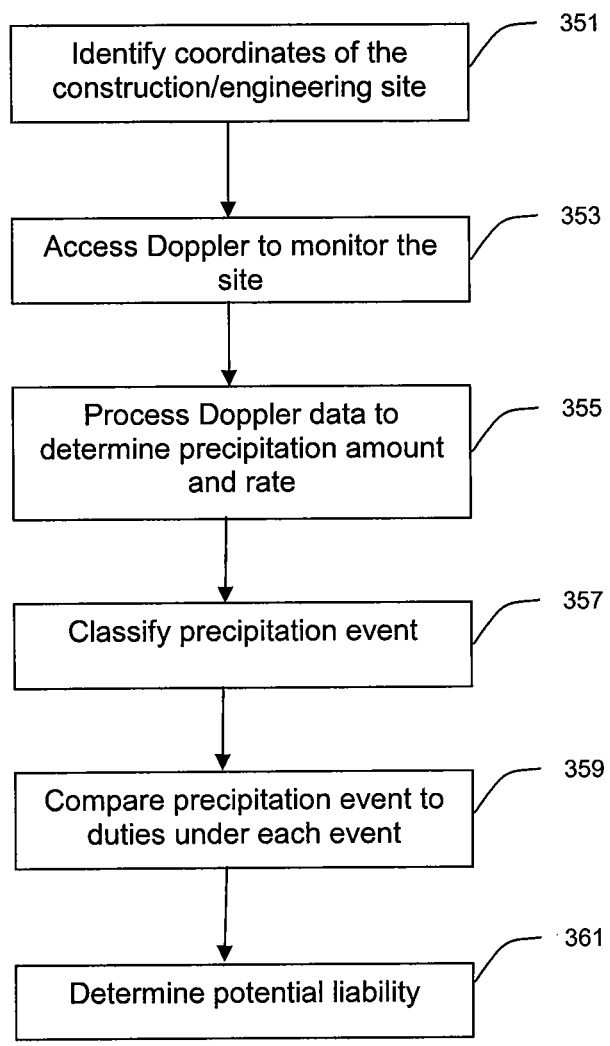
FIG. 3a is an exemplary flow chart illustrating a process for determining liabilities related to a rain event in accordance with one embodiment of the present invention.

FIG. 3a illustrates use of the system to determine liability based on a rain event. The system identifies the coordinates of the construction site, as shown in step 351. The system also access Doppler radar feeds to monitor the site, as shown in step 353. Subsequently, the system processes the Doppler data to determine the amount and rate of precipitation, as shown in step 355. Based on this determination, the system classifies/categorizes the rain event (e.g., a 25-year event), as shown in step 357. Typically jurisdictions dictate the duties for construction companies and, in turn, the lack of liabilities associated with improbable events, often considered acts of god or force majeure. The system obtains these duties and compares the potential liabilities to the categorized rain event, as shown in step 359, to determine potential liability, as shown in step 361.

In some embodiments, the systems and methods provide information to determine insurance liability as it relates to any instance involving rain or the lack thereof. In one embodiment, an insurance company indemnifies a construction company and insures the company for any missed deadlines or increased costs. Accordingly, the true number of rain days and corresponding liability can be determined. In another embodiment, the lack of rain fall necessary to meet the definition of "drought," as provided in an insurance claim, can be determined. The number of drought days may be assessed to determine whether an insurance payout must be made.

Figure 5:
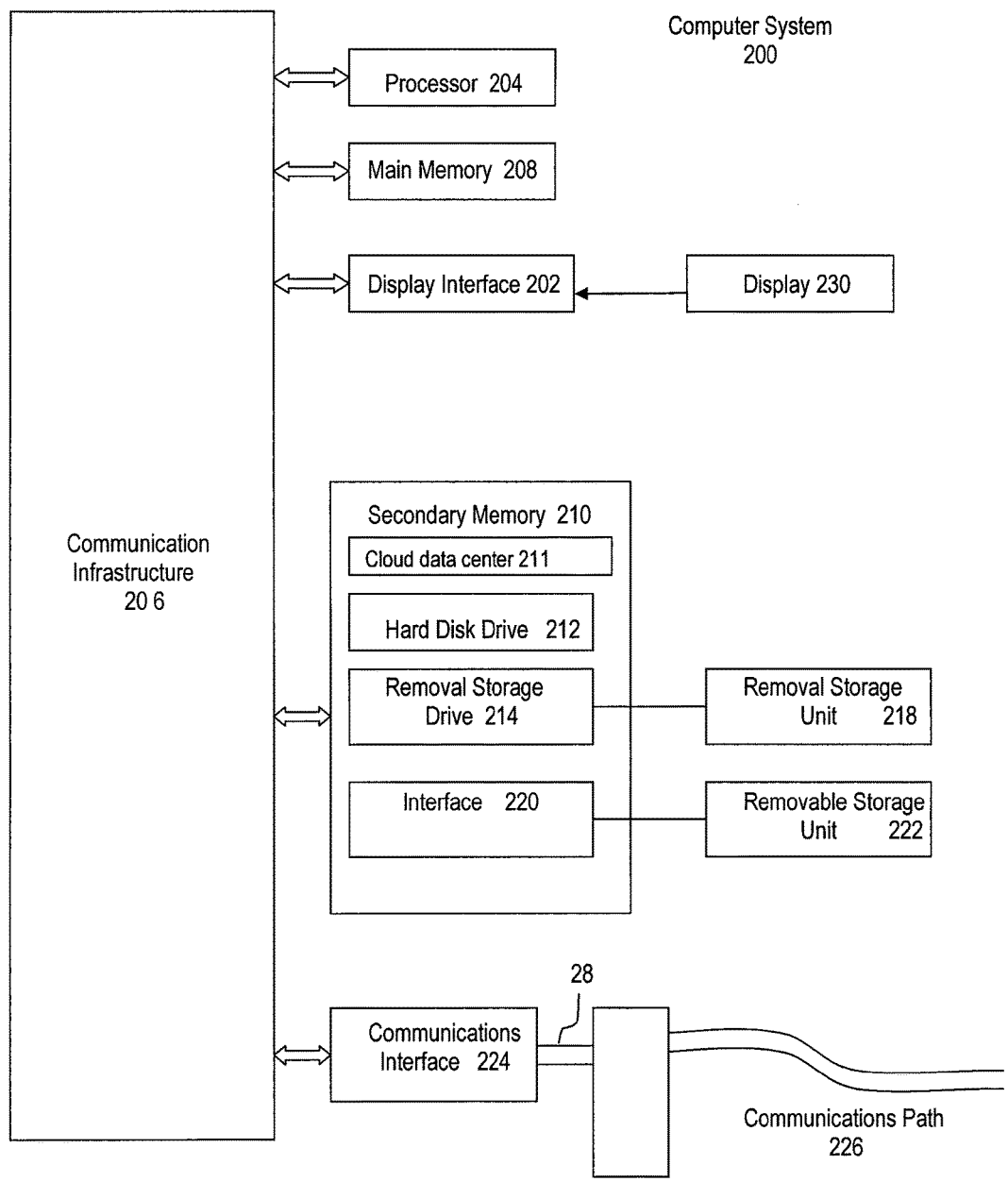
FIG. 5 is a functional block diagram of hardware, software, or a combination thereof that may be implemented in one or more computer systems or other processing systems to carry out the functionality for remote monitoring and related features in accordance with one embodiment of the present invention.

Aspects of methods or systems of the present invention may for example be implemented using hardware, software, or a combination thereof and may be implemented in one or more computer systems or other processing systems. In one embodiment, computer systems capable of carrying out the functionality described herein. An example of such a computer system is shown in FIG. 5.

Computer system 200 includes one or more processors, such as processor 204. Processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement systems or methods of embodiments of the present invention using other computer systems and/or architectures.

Computer system 200 can include a display interface 202 that forwards graphics, text, and other data from the communication infrastructure 206 (or from a frame buffer) for display on the display unit 230. Display interface 202 can include or involve processor 204, main memory 208, or other components in providing such functionality. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

If desired, some or all pertinent software, processing, and/or data can be performed or implemented by a hosting service (e.g., application or data host) such as a provider that has an array of servers connected to the Internet. Such implementations are sometimes referred to as cloud computing 211.

Computer system 200 may also include a communications interface 224. Communications interface 224 allows software and data to be transferred between computer system 200 and external devices. Examples of communications interface 224 may include a modem, a network interface (e.g., an Ethernet card), a communications port, a Personal Computer Memory Card International Association (PCM-CIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200.

Computer programs (also referred to as computer control logic) are stored in main memory 208 and/or secondary memory 210. Computer programs may also be received via communications interface 224. Such computer programs, when executed, enable the computer system 200 to perform the features of embodiments of the present invention, as discussed herein. In particular, the computer programs, when executed, enable the processor 204 to perform the features of embodiments of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, a combination of both hardware and software may be used for implementing such features.

Figure 6:
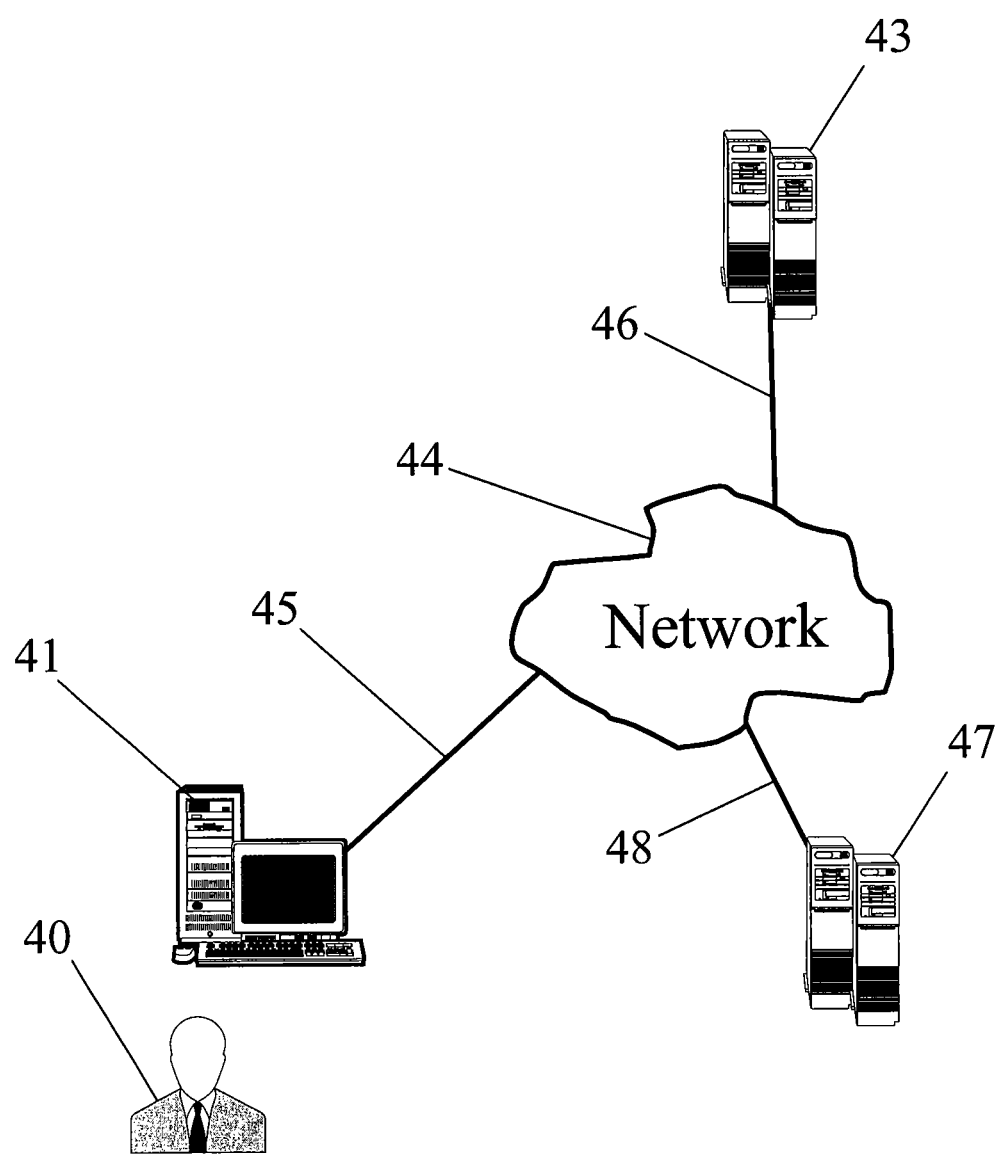
FIG. 6 is a functional block diagram of an exemplary system of various hardware components and other features in accordance with an embodiment of the present invention.

As shown in FIG. 6, in an embodiment of the present invention, the system and process of the present invention operates, for example, on a network. A user 40, such as an applicant or application processor inputs information, via a terminal 41, such as a personal computer (PC), minicomputer, mainframe computer, microcomputer, telephone device, personal digital assistant (PDA), or other device having a processor and input capability.

As further shown in FIG. 6, in one embodiment, the terminal 41 is coupled to a server 43, such as a PC, minicomputer, mainframe computer, microcomputer, or other device having a processor and a repository for data or connection to a repository for maintained data, via a network 44, such as the Internet, via couplings 45, 46, such as wired, wireless, or fiber optic connections.

EXAMPLE 1

Construction Rainfall Inspection Monitoring System

Figure 4B:
FIG. 4b is an exemplary map image of a roadway in accordance with one embodiment of the present invention.
Figure 4C:
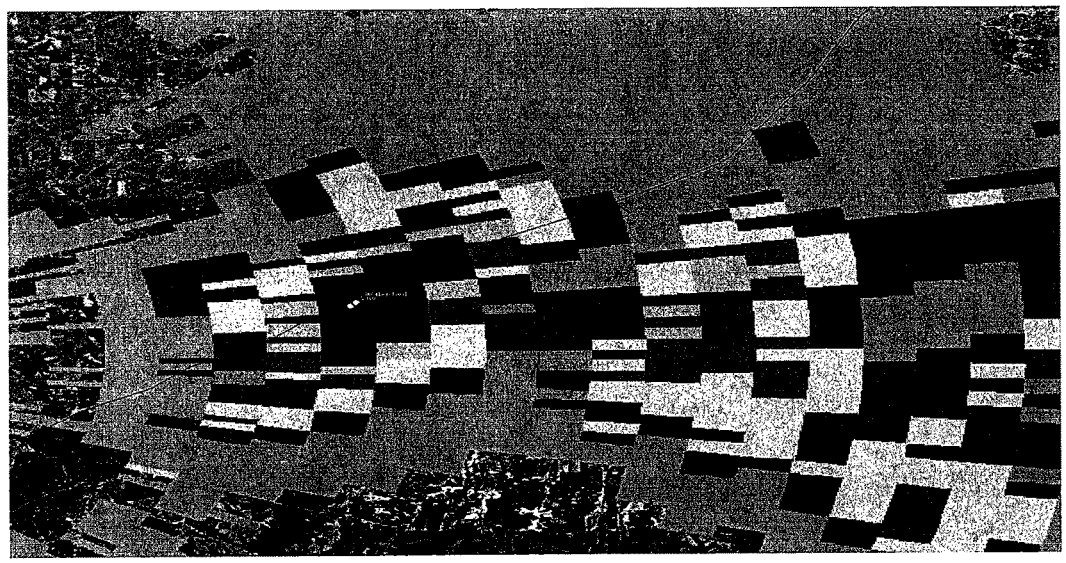
FIG. 4c is an exemplary overlay image of Doppler data on the map of FIG. 4b, showing storm concentrations in accordance with one embodiment of the present invention.

Portions of State Route 10 are in need of repair for a stretch of 8 miles in Alabama. A map of the relevant portions of State Route 10 is provided in FIG. 4b. In FIG. 4c, which provides a Doppler image overlay on the map, one can see heavier precipitation in the dark boxes, and lighter precipitation in the lighter grey boxes. Thus, under the conventional system of construction management, because parts of State Route 10 that form the construction site may have received excessive amounts of precipitation (greater than a threshold amount), the entire construction site would be closed for inspection until the construction is deemed workable, or until precipitation levels fall below the threshold level.

Pursuant to the systems and methods of the present invention, loci receiving precipitation on the construction site may be shut down, but loci receiving for example no, or little, precipitation may remain in operation, thereby positively contributing to the meeting of deadlines and budgetary requirements.

EXAMPLE 2

Construction Site Management

A construction company utilizes the system and methods of embodiments of the present invention to determine whether an expected storm requires closing a 12 kilometer highway construction site. The construction company sets up monitoring using Doppler data feeds of one kilometer stretches of the highway construction site. Information from the Doppler is collected, and processed by a computer program to determine how much precipitation has accumulated from the rainfall. For example, Doppler data of a construction site may provide results, e.g., precipitation levels, as of 4:00 AM. The system can receive the data at 4:15 AM, processes the data for another 5 minutes. At sub-site 1 of the construction site, 4 inches of precipitation as of 4:00 AM is detected. At sub-site 12 of the construction site, which is 12 kilometers further down road from sub-site 1, only 0.25 inches of precipitation is measured. The threshold level for closing a construction site is 2.5 inches. Based on the 4 am data, the system of the present invention sends an alert at 4:50 am to the regulatory body with jurisdiction over the construction site, contractors, and sub-contractors, indicating that sub-site 1 is closed for the day, and that all personnel should report to sub-site 12.

EXAMPLE 3

Rain Data Archive

A construction company is granted a contract by a state to work on a construction project. The contract is for a term for one year and allows for delays due to rain days. The construction company finishes the project in one year and five days and contends that it finished the project on time. The state argues that the construction company exceeded the contract by five days, and penalties may be levied (or incentives may be withheld). In one embodiment, a non-biased archive of rain days can be implemented to settle any disputes regarding rain days between contractors and the state.

EXAMPLE 4

Bridge Watershed Monitoring System

In the spring and summer in the Southern parts of the United States, storms and flash floods are common. These storms can occur locally in the area of a watershed without any evidence of rainfall nearby. As a result, one skilled in the art of onsite inspections may not be aware of each storm cell, and resulting area of precipitation.

Most jurisdictions recommend inspection of bridges after the occurrence of a significant rain event. The initial question is how to determine whether there has been significant event, and therefore would an inspection be warranted. Embodiments of the present invention can be used to monitor rainfall accumulations within a watershed using Doppler data. The system can model the watershed to determine a precipitation level that would cause a significant event, e.g., a 25-year, 50-year, or 100-year discharge.

The system would be programmed to collect rainfall data from a watershed every four to six minutes when raining. The system preferably simultaneously calculates rainfall accumulations within the watershed. Once a threshold value associated with the watershed is met, an email is forwarded to government inspectors to request inspection of the bridge.

In some embodiments, a database can be configured and stored, such as on a computer system (e.g., the computer system as shown in FIG. 5). The database may store records, for example, identifying a plurality of geographically dispersed sites, site coordinates (e.g., the range of coordinates that matches or approximately matches the physical shape of the site to the geographical location where it sit or covers), and the type of site. Thus, the system can store detailed information about a large number of sites (e.g., in a city, county, state, or multiple states). The database may also store specific information corresponding to a plurality of different weather events that meet certain criteria (e.g., a threshold). The database may also store information to track the commencement of a weather event and, for example, its accumulation. The system may receive data from one more sources such as Doppler radar or regulatory agencies to occupy the database. Software and hardware may be implemented to interact with the database to monitor many different sites (e.g., simultaneously) and to identify which one of the different threshold events has been triggered at which sites or sub-site (e.g., a 5-rain event is triggered at one sub-site and a 25-year rain event is triggered at another sub-site). Thus, the system may be configured to receive data corresponding to weather information such as rain conditions, store that information in the database, and process the information to determine which one of a number of different events have occurred, and generate an output information to a user or transmit an alert such as to a third party to halt further project work.

The system may have and record information about the field of use such as insurance, construction, etc. The system may implement different definitions for the same event so as to possibly have variable definitions per client (e.g., state department of transportation, insurance company, etc.) For example, the same insurance company may have different definitions for an event such as drought for different insurers or for different states or localities. The system may also respond differently to different weather conditions or events. For example, the system may receive weather information, apply the information (e.g., apply it continuously or periodically) to the recorded definitions or site related data, and in response generate different alerts (e.g., insurance alert, regulatory alert, etc.) and/or send to generate a monitoring report.

The specification and figures are to be regarded in an illustrative manner, rather than a restrictive one, and all such modifications are intended to be included within the scope of present invention. Although preferred embodiments of the invention have been described in the foregoing description, it will be understood that the invention is not limited to the specific embodiments disclosed herein but is capable of numerous modifications by one of ordinary skill in the art. It will be understood that the materials used and technological details may be slightly different or modified from the descriptions herein without departing from the methods and compositions disclosed and taught by the present invention. Many variations and modifications will be apparent to those of ordinary skill in the art. Benefits, advantages, solutions to problems, and any element(s) that may cause any benefit, advantage, or solution to occur or become more pronounced are not to be construed as critical, required, or essential features or elements of any or all the claims.

What is claimed is:

1. A method for measuring precipitation impact on construction and engineering inspection locations comprising:
    selecting a particular construction and engineering location, wherein the selected construction and engineering location is the subject of construction and engineering;
    receiving rainfall information representing an amount of precipitation that has already fallen on the selected construction and engineering location over a past period of time using geographic information for the selected location with a monitoring system, wherein said geographic information comprises Doppler radar data;

storing the rainfall information into memory, the memory containing a plurality of entries of stored rainfall information over a set time period defined by a 24 hour window immediately prior to a current time at which an amount of precipitation is measured at the particular construction and engineering location;

deleting an entry of the plurality of entries of stored rainfall information from the memory that is outside the set time period such that the 24 hour window is continuously adjusted and rolling based on the current time;

calculating a total amount of precipitation over the set time period;

setting the monitoring system with a threshold value of precipitation for the construction and engineering location;

evaluating the calculated amount of precipitation over the set time period against the set threshold value;

determining whether the calculated amount of precipitation that has already fallen on the construction and engineering location over the set time period exceeds the threshold value of precipitation; and transmitting an alert which initiates deployment of an inspector to said construction and engineering location.

2. The method of claim 1, wherein the rainfall is measured for a period of time that is at least more than five minutes in the past.

3. The method of claim 1, wherein the threshold level of the measured rainfall is established by a regulatory body.

4. The method of claim 1, wherein the threshold level corresponds to an authorization control for construction and engineering duties.

5. The method of claim 1, further comprising:
deploying an on-site inspection of the selected construction and engineering location when the previously measured precipitation at the geographic location is at least equal to the threshold value.

6. The method of claim 1, further comprising:
determining the ability to perform construction and engineering at the selected construction and engineering location when the previously measured precipitation at the geographic location is at least equal to the threshold value.

7. The method of claim 1, further comprising:
comparing the previously measured precipitation at the geographic location to a rain event value.

8. The method of claim 7, further comprising:
determining potential liability associated with a construction or engineering company.

9. The method of claim 8, wherein the potential liability corresponds to flood damages.

10. The method of claim 8, wherein the potential liability corresponds to construction work days.

11. The method of claim 1, wherein the monitoring system includes more than one monitored site on the selected construction and engineering location.

12. The method of claim 11, wherein the monitoring system at each monitored site measures the rainfall and compares the measured rainfall with the threshold value specific to the construction and engineering location.

13. The method of claim 1, wherein the construction and engineering location comprises a road, a bridge, a tunnel, a dam, a building, a watershed, a combination thereof, or any construction site and the grounds of and adjacent to such site.

14. The method of claim 13, which further comprises subdividing the selected construction and engineering location into portions, wherein the previously measured precipitation at a first portion of the selected construction and engineering location exceeds the corresponding threshold value for the rainfall so that engineering and construction activities only in the first portion of the selected construction and engineering location are shut down due to the measured rainfall exceeding the threshold value rather than shutting down such activities for the entire selected construction and engineering location.

15. The method of claim 14, wherein a first portion of the selected construction and engineering location is determined to be closed to construction and engineering.

16. The method of claim 1, wherein the remote monitoring system comprises at least one weather station disposed on the selected construction and engineering location.

17. The method of claim 1, wherein each device of the monitoring system is located entirely remote from the selected construction and engineering location.

18. The method of claim 17, wherein the remote monitoring system comprises at least one of satellite imagery and radar.

19. The method of claim 1, wherein the monitoring system comprises said Doppler radar data and at least one interpolation methods to calculate precipitation levels from rainfall.

20. The method of claim 1, wherein the threshold value is variable.

21. The method of claim 1, wherein the end-user is contacted via at least one of the following: email, SMS message, MMS message, telephone, and the Internet.

22. The method of claim 1, wherein the selected construction and engineering location is determined at a point defined by the intersection of a particular latitude and longitude, and the rainfall information is received in substantially real-time.

23. A method for measuring precipitation impact on construction and engineering inspection locations comprising:

receiving the coordinates for a particular geographic location, wherein the geographic location is the subject of construction and engineering;

remotely measuring a weather condition that includes precipitation at the geographic location with a monitoring system, wherein said monitoring system comprises Doppler radar data;

processing a threshold value of precipitation at the geographic location;

collecting rainfall information representing an amount of precipitation that has already fallen on-the geographic location over a past period of time using geographic information for the selected location with a monitoring system;

storing the rainfall information into memory, the memory containing a plurality of entries of stored rainfall information over a set time period defined by a 24 hour window immediately prior to a current time at which an amount of precipitation is measured at the particular construction and engineering location;

deleting an entry of the plurality of entries of stored rainfall information from the memory that is outside the set time period such that the 24 hour window is continuously adjusted and rolling based on the current time;

calculating a total amount of precipitation over the set time period;

determining whether the calculated amount of precipitation that has already fallen on the geographic location over the set time period exceeds the threshold value; and transmitting an alert which initiates deployment of an inspector to said geographic location.

24. The method of claim 23, further comprising:

processing a work report of construction and engineering at the geographic location;

processing an on-site inspection of the geographic location; and transmitting an order for the on-site inspection to at least one inspector when the measured precipitation exceeds the threshold value.

25. The method of claim 23, further comprising:

processing potential liability dependent on the precipitation for at least one construction and engineering entity.

26. An article of manufacture comprising:

a non-transitory computer readable medium containing computer instructions stored therein;

a data structure stored thereon adapted and configured to route signals, wherein the data structure comprises a computer readable system for measuring precipitation impact on construction and engineering inspection locations; and a processing system configured and adapted to communicate using the data structure with a plurality of computers, wherein the processing system is arranged to perform the instructions stored on the non-transitory computer readable medium, which causes the processor to:

receive the coordinates of a construction and engineering location, wherein the construction and engineering location is the subject of construction and engineering;

remotely measure a weather condition that includes precipitation at the geographic location with a remote monitoring system, wherein the remote monitoring system is programmed with a threshold value of precipitation, and wherein said remote monitoring system comprises Doppler radar data;

collect rainfall information representing an amount of precipitation that has already fallen on-the construction and engineering location over a past period of time using geographic information for the selected location with a monitoring system;

store the rainfall information into memory, the memory containing a plurality of entries of stored rainfall information over a set time period defined by a 24 hour window immediately prior to a current time at which an amount of precipitation is measured at the particular construction and engineering location;

delete an entry of the plurality of entries of stored rainfall information from the memory that is outside the set time period such that the 24 hour window is continuously adjusted and rolling based on the current time;

calculate a total amount of precipitation over the set time period;

evaluate the calculated amount of precipitation over the set time period against the threshold value;

determine whether the calculated amount of precipitation that has already fallen on the construction and engineering location over the set time period exceeds the threshold value; and provide an alert which initiates deployment of an inspector to said construction and engineering location.

27. A system for measuring precipitation impact on construction and engineering inspection locations comprising:

means for determining a particular geographic location, that is the subject of construction and engineering;

means for remotely measuring precipitation at the geographic location with a monitoring system, and wherein said means for remotely measuring precipitation comprises Doppler radar data;

means for setting a local device of the remote monitoring system with a threshold value of the precipitation at the geographic location;

means for collecting rainfall information representing an amount of precipitation that has already fallen on-the geographic location over a past period of time using geographic information for the selected location with a monitoring system;

means for storing the rainfall information into memory, the memory containing a plurality of entries of stored rainfall information over a set time period defined by a 24 hour window immediately prior to a current time at which an amount of precipitation is measured at the particular construction and engineering location;

means for deleting an entry of the plurality of entries of stored rainfall information from the memory that is outside the set time period such that the 24 hour window is continuously adjusted and rolling based on the current time;

means for calculating a total amount of precipitation over the set time period;

means for determining whether the calculated amount of precipitation that has already fallen on the geographic location over the set time period exceeds the threshold value; and means for transmitting an alert which initiates deployment of an inspector to said geographic location.

28. A method for measuring precipitation impact on construction and engineering inspection locations comprising:

determining a particular geographic location that is the subject of construction and engineering;

remotely measuring precipitation at the geographic location with a monitoring system;

collecting rainfall information representing an amount of precipitation that has already fallen on-the geographic location over a past period of time using geographic information for the selected location with a monitoring system;

storing the rainfall information into memory, the memory containing a plurality of entries of stored rainfall information over a set time period defined by a 24 hour window immediately prior to a current time at which an amount of precipitation is measured at the particular construction and engineering location;

deleting an entry of the plurality of entries of stored rainfall information from the memory that is outside the set time period such that the 24 hour window is continuously adjusted and rolling based on the current time;

calculating a total amount of precipitation over the set time period;

setting a local device of the remote monitoring system with a threshold value of the precipitation at the geographic location;

evaluating the calculated amount of precipitation over the set time period against the set threshold value;

determining whether the calculated amount of precipitation that has already fallen on the geographic location over the set time period exceeds the threshold value; and transmitting an alert which initiates deployment of an inspector to said geographic location.

* * * * *